United States Patent
Maeda

(10) Patent No.: US 10,297,154 B2
(45) Date of Patent: May 21, 2019

(54) PARKING ASSISTANCE SYSTEM

(71) Applicant: Mitsubishi Electric Corporation, Tokyo (JP)

(72) Inventor: Takashi Maeda, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/792,921

(22) Filed: Oct. 25, 2017

(65) Prior Publication Data

US 2018/0330613 A1    Nov. 15, 2018

(30) Foreign Application Priority Data

May 11, 2017    (JP) .................................. 2017-094334

(51) Int. Cl.
| | | |
|---|---|---|
| *G08G 1/14* | (2006.01) | |
| *H04W 4/04* | (2009.01) | |
| *G05D 1/02* | (2006.01) | |
| *G08G 1/16* | (2006.01) | |

(52) U.S. Cl.
CPC ........... *G08G 1/142* (2013.01); *G05D 1/0225* (2013.01); *G08G 1/168* (2013.01); *H04W 4/046* (2013.01)

(58) Field of Classification Search
CPC ....... G08G 1/142; G08G 1/168; H04W 4/046; G05D 1/0225
See application file for complete search history.

(56) References Cited

U.S. PATENT DOCUMENTS

| | | | | |
|---|---|---|---|---|
| 2016/0284217 A1* | 9/2016 | Lee | ........................ | G08G 1/143 |
| 2017/0032674 A1* | 2/2017 | Baasch | ................ | G05D 1/0276 |
| 2017/0329341 A1* | 11/2017 | Rakshit | ................ | G05D 1/0225 |

FOREIGN PATENT DOCUMENTS

| | | |
|---|---|---|
| JP | 2008-269358 A | 11/2006 |
| JP | 2009-175962 A | 8/2009 |
| JP | 2009-205191 A | 9/2009 |
| JP | 2014-240244 A | 12/2014 |

OTHER PUBLICATIONS

Communication dated Jan. 30, 2018, from the Japanese Patent Office in counterpart application No. 2017-094334.

* cited by examiner

*Primary Examiner* — Ryan W Sherwin
(74) *Attorney, Agent, or Firm* — Sughrue Mion, PLLC; Richard C. Turner

(57) ABSTRACT

In order to detect and determine a parking space that matches the size of an own vehicle, a parking assistance system includes a parking assistance apparatus (1) mounted to the own vehicle and a parking assistance apparatus (2) mounted to each of other vehicles. A communication device (21) is configured to transmit, when the other vehicles exit from parking spaces, sizes of the parking spaces of the other vehicles detected by a parking space sensor (24) and positions of the parking spaces detected by a position sensor (25). A route calculation unit (12) is configured to select, based on the sizes and positions of the parking spaces of the other vehicles received by a communication device (11), a parking space in which the own vehicle is capable of being parked, and which is the closest to the own vehicle.

8 Claims, 5 Drawing Sheets

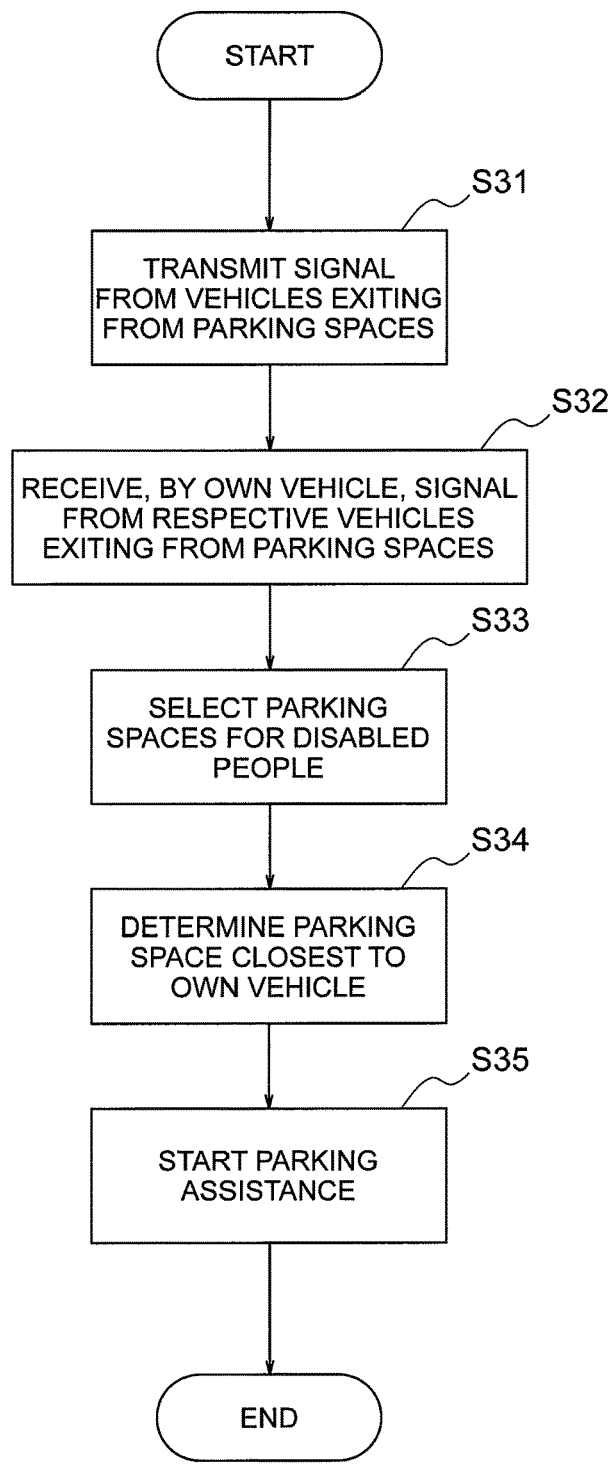

PARKING ASSISTANCE SYSTEM

BACKGROUND OF THE INVENTION

1. Field of the Invention

The present invention relates to a parking assistance system, and more particularly, to a parking assistance system configured to assist with parking of a vehicle and other such mobile bodies.

2. Description of the Related Art

Hitherto, there has been proposed a parking assistance system for assisting with parking. For example, the structure and operation of a related-art parking assistance system disclosed in Japanese Patent Application Laid-open No. 2014-240244 is as described below.

The related-art parking assistance system disclosed in Japanese Patent Application Laid-open No. 2014-240244 is configured to assist an own vehicle with parking in a parking space. In Japanese Patent Application Laid-open No. 2014-240244, a direction sensor is configured to detect an exit direction of other vehicle exiting from a parking space based on vehicle-to-vehicle communication to and from the other vehicle. Further, a route calculation unit is configured to acquire a position of the own vehicle with respect to a parking space.

Specifically, the related-art parking assistance system disclosed in Japanese Patent Application Laid-open No. 2014-240244 is configured to determine a stop position of the own vehicle based on the exit direction detected by the direction sensor and the position of the own vehicle with respect to the parking space acquired by the route calculation unit. With this structure and operation, the related-art parking assistance system disclosed in Japanese Patent Application Laid-open No. 2014-240244 can determine an appropriate stop position of the own vehicle based on the exit direction of the other vehicle and the position of the own vehicle, which allows the own vehicle to smoothly enter the parking space without hindering the other vehicle from exiting from the parking space.

As described above, the related-art parking assistance system disclosed in Japanese Patent Application Laid-open No. 2014-240244 is configured to determine the stop position of the own vehicle based on the exit direction detected by the direction sensor and the position of the own vehicle with respect to the parking space acquired by the route calculation unit. As a result, the stop position of the own vehicle can be determined in accordance with the exit direction of the other vehicle, and the own vehicle can smoothly enter the parking space with the least amount of hindrance to the exit of the other vehicle.

However, when the own vehicle enters (is parked in) the parking space from which the other vehicle has exited, if the size (i.e., width, length, or height) of the own vehicle exceeds the size of that parking space, the own vehicle cannot enter (cannot be parked in) the parking space. As a result, there is a problem in that even when the stop position of the own vehicle has been determined, that determination may be meaningless.

SUMMARY OF THE INVENTION

The present invention has been made in order to solve the above-mentioned problem, and it is an object of the present invention to provide a parking assistance system capable of detecting and determining a parking space that matches the size of an own vehicle.

According to one embodiment of the present invention, there is provided a parking assistance system, which is configured to assist with parking of an own vehicle in a parking space. The parking assistance system includes: a first parking assistance apparatus mounted to the own vehicle; and a second parking assistance apparatus mounted to other vehicles different from the own vehicle. The second parking assistance apparatus includes: a second size information acquisition unit configured to acquire information on one of sizes of parking spaces in which the other vehicles are parked and sizes of the other vehicles to output the acquired information as size information on the other vehicles; a second position detection unit configured to detect and output information on a position of the parking spaces of the other vehicles; and a second communication unit configured to transmit, when the other vehicles exit from the parking spaced, the size information on the other vehicles and the information on the positions of the parking spaces of the other vehicles. The first parking assistance apparatus includes: a first communication unit configured to receive the size information on the other vehicles and the information on the positions of the parking spaces of the other vehicles, which are transmitted from the second communication unit; a first position detection unit configured to detect a position of the own vehicle to output information on the position of the own vehicle; a selection unit configured to select parking spaces in which the own vehicle is capable of being parked based on the size information on the other vehicles received by the first communication unit; a determination unit configured to determine, based on the information on the positions of the parking spaces of the other vehicles received by the first communication unit and the information on the position of the own vehicle, the parking space closest to the own vehicle from among the parking spaces selected by the selection unit; and a parking assistance control unit configured to perform control for guiding the own vehicle to the parking space determined by the determination unit.

The parking assistance system according to the one embodiment of the present invention is configured to select the parking spaces in which the own vehicle is capable of being parked based on the size information on the other vehicles, and to determine, from among the selected parking spaces, the parking space closest to the own vehicle, thereby being capable of detecting and determining the parking space that matches the size of the own vehicle.

BRIEF DESCRIPTION OF THE DRAWINGS

FIG. 5 is a flowchart for illustrating operation of a parking assistance system according to a third embodiment of the present invention.

DESCRIPTION OF THE EMBODIMENTS

First Embodiment

Figure 1:
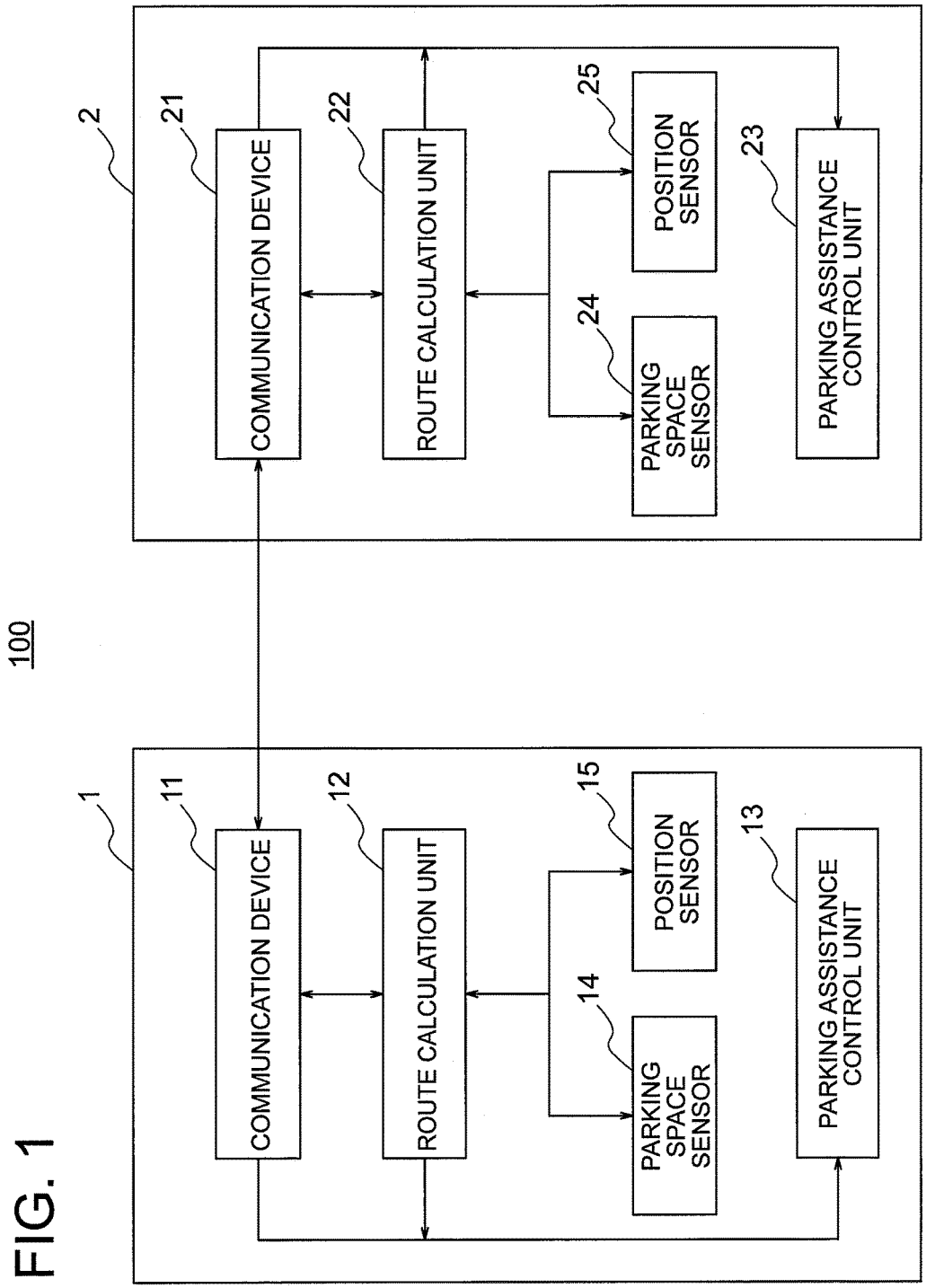
FIG. 1 is a block diagram for illustrating a configuration of a parking assistance system according to a first embodiment of the present invention.
Figure 2:
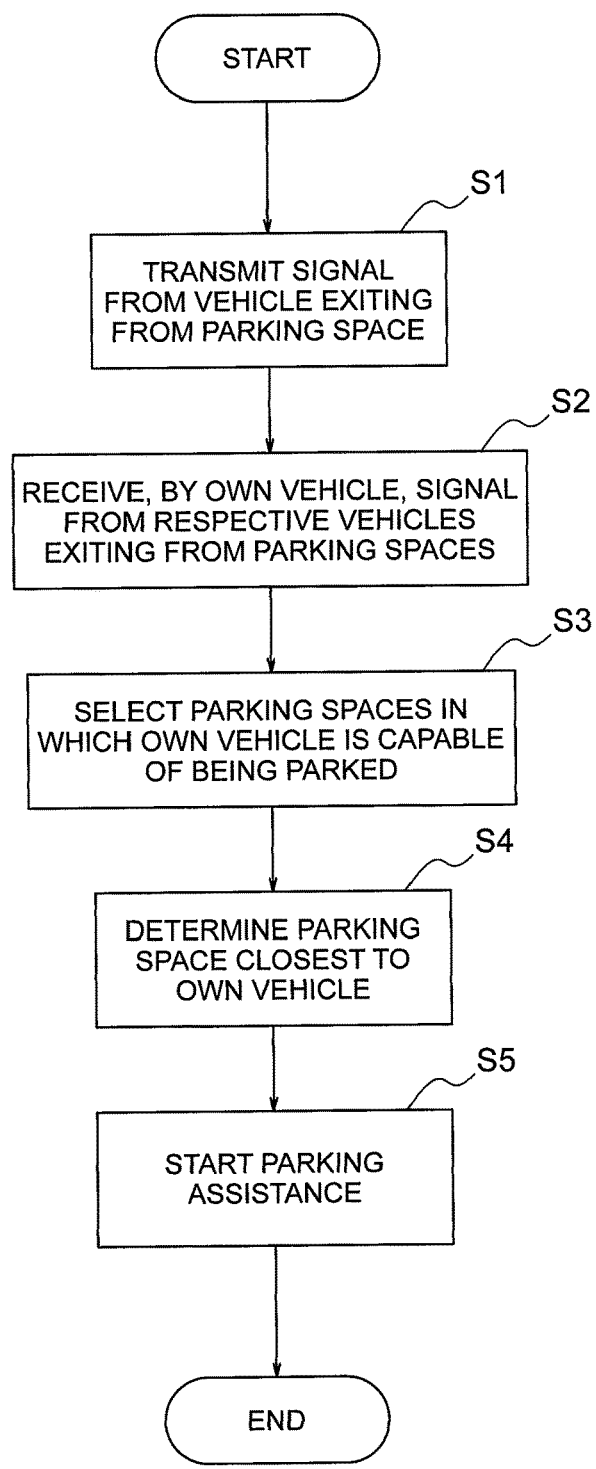
FIG. 2 is a flowchart for illustrating operation of the parking assistance system according to the first embodiment of the present invention.

Now, a parking assistance system according to a first embodiment of the present invention is described with reference to the accompanying drawings. FIG. 1 is a block diagram for illustrating a configuration of the parking assistance system according to the first embodiment. FIG. 2 is a processing flowchart for illustrating a flow of processing of the parking assistance system according to the first embodiment.

First, the configuration of the parking assistance system according to the first embodiment and a configuration of a parking assistance apparatus included in the parking assistance system are described with reference to FIG. 1. FIG. 1 is a schematic block diagram for illustrating an outline of the configuration of a parking assistance system 100. As illustrated in FIG. 1, the parking assistance system 100 includes a plurality of parking assistance apparatus (in the following, for example, parking assistance apparatus 1 and 2). The parking assistance system 100 is a system device configured to assist with the parking by an automobile or other such mobile vehicle having the parking assistance apparatus 1 mounted thereto (hereinafter referred to as "own vehicle") in a parking space.

As illustrated in FIG. 1, the parking assistance apparatus 1 includes a communication device 11, a route calculation unit 12, a parking space sensor 14, a position sensor 15, and a parking assistance control unit 13. The communication device 11 is capable of communicating, for example wireless communication, to and from the parking assistance apparatus 2, which is present within a predetermined distance range from the communication device 11.

In order to simplify the drawings, in FIG. 1, there is illustrated a case in which there is one parking assistance apparatus 2. However, in actuality, there are one or more parking assistance apparatus 2. One parking assistance apparatus 2 is mounted to each of the vehicles (hereinafter referred to as "(other vehicles") other than the own vehicle. The parking assistance system 100 is configured to select one or more parking spaces in which the own vehicle is capable of being parked from among empty parking spaces, and to assist the own vehicle with parking in that parking space.

The parking assistance apparatus 2 includes the same component parts as those of the parking assistance apparatus 1. Specifically, the parking assistance apparatus 2 includes a communication device, a route calculation unit, various sensors, and a parking assistance control unit. However, in order to facilitate a description of processing to be performed between the parking assistance apparatus 1 and the parking assistance apparatus 2, the parking assistance apparatus 2 is described below as including a communication device 21, a route calculation unit 22, a parking space sensor 24, a position sensor 25, and a parking assistance control unit 23.

The communication device 11 is a communication function part configured to transmit and receive various types of information by performing vehicle-to-vehicle communication to and from respective communication devices 21 present within a distance range set in advance. The communicable area of the communication device 11 is the interior of a circle drawn around the position of the communication device 11 serving as the "center of the circle" with the distance set in advance serving as the "radius of the circle". As a result, the communication device 11 is configured to perform communication to and from the respective communication devices 21 present in the communicable area. The communication device 11 is configured to employ 700 MHz vehicle-to-vehicle communication, 5 GHz vehicle-to-vehicle communication, and communication by using Bluetooth (trademark), a wireless local area network (LAN), or a mobile phone, for example. It is desired that the communicable area include the whole parking lot, and hence it is desired that the communicable area have a radius of from about 10 m to about 300 m.

The parking space sensor 14 is configured to detect the size of the parking space in which the own vehicle is currently parked, and to output the detection result as information on the size of the parking space. The parking space sensor 14 is configured to detect, as the information on the size of the parking space, at least one of a width, a length, or a height of the parking space. The parking space sensor 14 is built from, for example, a peripheral camera, a sonar device, a millimeter-wave radar, and a light detection and ranging (LIDAR) device.

The position sensor 15 is configured to detect the position of the own vehicle, and to output the detection result as information on the position of the own vehicle or as information on the position of the parking space of the own vehicle. The position sensor 15 is built from a global positioning system (GPS) device, for example.

The route calculation unit 12 is an arithmetic processing part configured to select and determine a parking space for the own vehicle to park in, and to calculate a movement route to the parking space along which the own vehicle is to move. The route calculation unit 12 is configured to select a parking space having a size in which the own vehicle is capable of being parked from among empty parking spaces based on information on the sizes of the parking spaces of the other vehicles received by the communication device 11 from the communication devices 21, and to calculate the movement route of the own vehicle to that parking space. In order to select a parking space having a size in which the own vehicle is capable of being parked, the route calculation unit 12 is configured to store in advance a lower threshold for the size of the parking space (i.e., width, length, or height of the parking space). The route calculation unit 12 is thus configured to select a parking space having a size larger than that lower threshold as the parking space having a size in which the own vehicle is capable of being parked. When there are a plurality of parking spaces capable of being parked in, the route calculation unit 12 selects a parking space closest to the own vehicle based on the information on the positions of the parking spaces of other vehicles received by the communication device 11 from the communication devices 21 and the information on the position of the own vehicle detected by the position sensor 15.

The parking assistance control unit 13 is a control processing part configured to perform movement assistance (assistance including automatic travel control, for example, autocruise, and brake control) when the own vehicle travels (including, for example, exit from a parking space and entry into a parking space) or stops (i.e., comes to a halt) on the movement route calculated by the route calculation unit 12. The parking assistance control unit 13 is configured to cause the own vehicle to travel based on the movement route calculated by the route calculation unit 12, and to cause the own vehicle to park in the parking space selected by the route calculation unit 12.

The parking assistance apparatus 1 comprises, for example, a processor and a memory to perform processes of the route calculation unit 12 and the parking assistance control unit 13. The memory stores a program executed by the processor to perform the processes of the route calculation unit 12 and the parking assistance control unit 13.

The parking assistance apparatus 2 has the same functions as those of the parking assistance apparatus 1. Specifically, the communication devices 21, the route calculation units 22, the parking assistance control units 23, the parking space sensor 24, and the position sensors 25 disposed in the parking assistance apparatus 2 have the same functions as, and perform the same operations as those of the communication device 11, the route calculation unit 12, the parking assistance control unit 13, the parking space sensor 14, and the position sensor 15, respectively. Therefore, the description of those parts is omitted here.

Next, operation of each of the parts of the parking assistance apparatus 1 is described with reference to FIG. 2.

First, when other vehicles, to which the parking assistance apparatus 2 are mounted, intend to exit from respective parking spaces, information on the other vehicles are transmitted to the communication device 11 of the own vehicle from the communication devices 21 mounted to the respective other vehicles (Step S1). The information on the other vehicles are information indicating that the other vehicles intend to exit from the respective parking spaces. The information on the other vehicles contain information on the exit directions of the other vehicles. The information on the other vehicles also contain information on the sizes (e.g., width, length, or height) of the parking spaces of the other vehicles acquired by the respective parking space sensors 24 and information on the positions of the parking spaces of the other vehicles acquired by the position sensor 25.

Next, the communication device 11 sequentially receives the information on other vehicles concerning the respective other vehicles transmitted from the respective communication devices 21 of the plurality of other vehicles (Step S2).

Next, the route calculation unit 12 compares the information on the sizes (e.g., widths, lengths, or heights) of the parking spaces of the plurality of other vehicles to one another by using the received information on the other vehicles, and selects the parking spaces in which the own vehicle is capable of being parked from among those parking spaces (Step S3).

Next, the route calculation unit 12 determines the parking space closest to the own vehicle by comparing the information on the positions of the respective parking spaces selected in Step S3 and the information on the position of the own vehicle acquired from the position sensor 15 (Step S4).

Next, the route calculation unit 12 calculates a movement route to the parking space determined in Step S4, and the parking assistance control unit 13 performs control for guiding the own vehicle to that parking space based on the calculated movement route (Step S5).

As described above, according to the first embodiment, the parking spaces, in which the own vehicle can be parked and the size thereof (i.e., width, length, or height) matches with the size of the own vehicle, can be determined from among the parking spaces of the plurality of other vehicles which intend to exit from the parking spaces.

Second Embodiment

Figure 3:
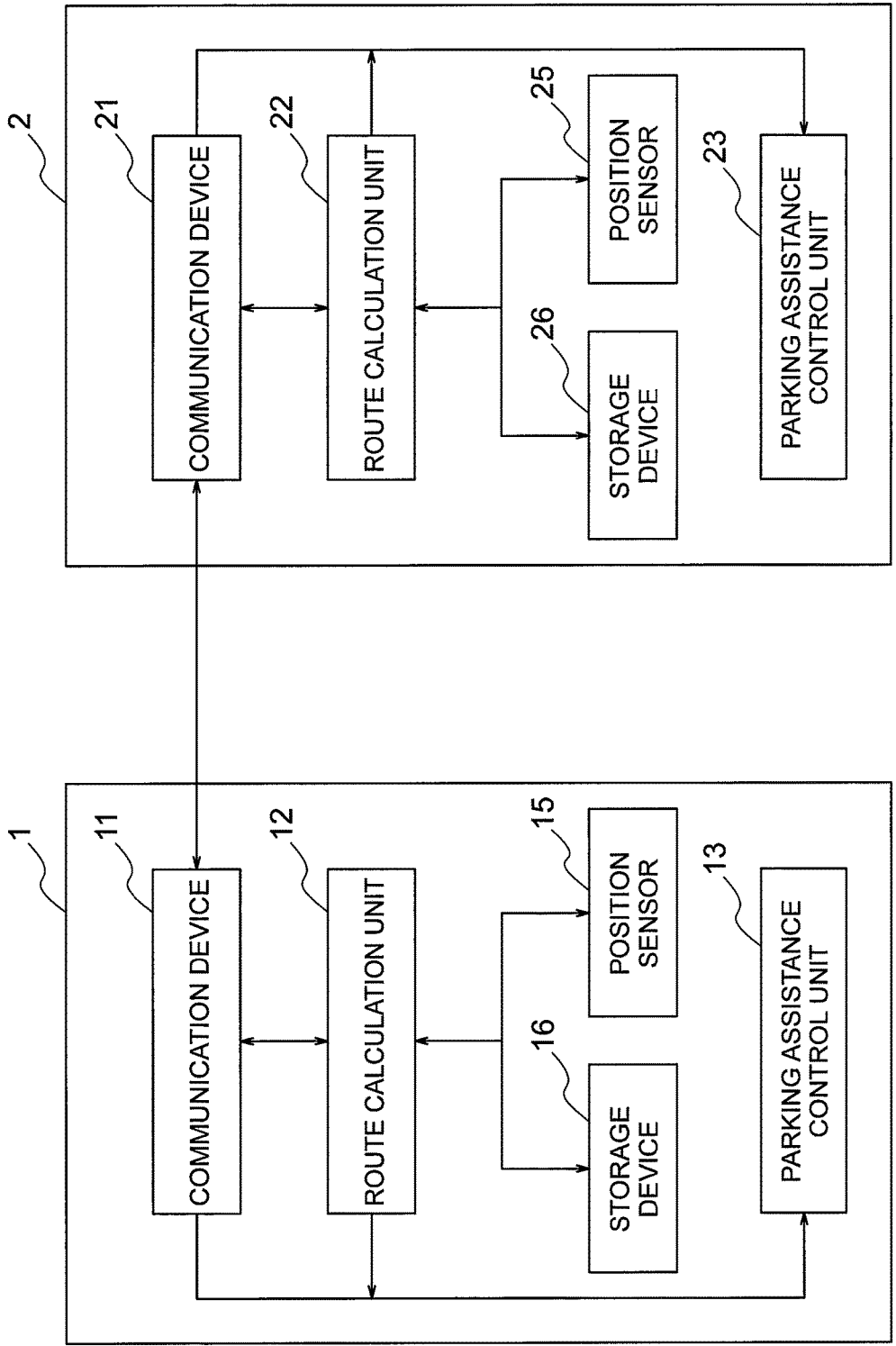
FIG. 3 is a block diagram for illustrating a configuration of a parking assistance system according to a second embodiment of the present invention.
Figure 4:
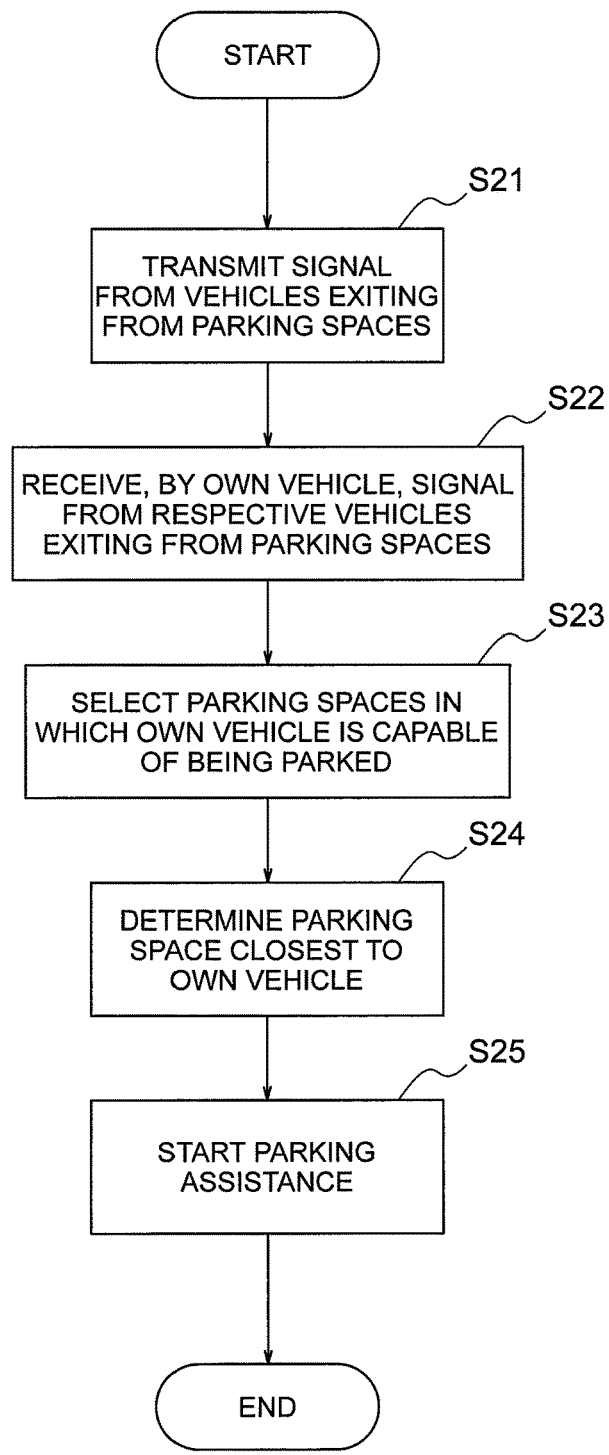
FIG. 4 is a flowchart for illustrating operation of the parking assistance system according to the second embodiment of the present invention.

Now, a parking assistance system according to a second embodiment of the present invention is described with reference to the accompanying drawings. FIG. 3 is a block diagram for illustrating a configuration of the parking assistance system according to the second embodiment. Further, FIG. 4 is a flowchart for illustrating a flow of processing of the parking assistance system according to the second embodiment.

The configuration of the parking assistance system according to the second embodiment and a configuration of a parking assistance apparatus included in the parking assistance system are described with reference to FIG. 3. FIG. 3 is a schematic block diagram for illustrating an outline of the configuration of a parking assistance system 200. The parking assistance system 200 includes a plurality of parking assistance apparatus (in the following, for example, parking assistance apparatus 1 and 2). The parking assistance system 200 is a system device configured to assist with the parking by an automobile or other such mobile vehicle having the parking assistance apparatus 1 mounted thereto (hereinafter referred to as "own vehicle") in a parking space.

As illustrated in FIG. 3, the parking assistance apparatus 1 includes a communication device 11, a route calculation unit 12, a storage device 16, a position sensor 15, and a parking assistance control unit 13. Similarly to the first embodiment, the communication device 11 is capable of communicating, for example communicating via wireless communication, to and from the parking assistance apparatus 2, which are present within a communicable area of the communication device 11. In order to simplify the drawings, only one parking assistance apparatus 2 is illustrated in FIG. 3. However, in actuality, there are one or more parking assistance apparatus 2. One parking assistance apparatus 2 is mounted to each of the one or more other vehicles (hereinafter referred to as "(other vehicles") other than the own vehicle.

The parking assistance apparatus 2 includes the same functions as those of the parking assistance apparatus 1. Specifically, similarly to the parking assistance apparatus 1, the parking assistance apparatus 2 includes a communication device, a route calculation unit, various sensors, and a parking assistance control unit. However, in order to facilitate a description of processing to be performed between the parking assistance apparatus 1 and the parking assistance apparatus 2, the parking assistance apparatus 2 is described below as including a communication device 21, a route calculation unit 22, a storage device 26, a position sensor 25, and a parking assistance control unit 23. The communication device 21, the route calculation unit 22, the parking assistance control unit 23, the storage device 26, and the position sensor 25 disposed in the parking assistance apparatus 2 have the same functions as, and perform the same operations as those of the communication device 11, the route calculation unit 12, the parking assistance control unit 13, the storage device 16, and the position sensor 15, respectively.

In the parking assistance apparatus 1, the storage device 16 is configured to store information on the size of the own vehicle. The storage device 16 is configured to store, as information on the size of the own vehicle, at least one of, for example, the width, the length, or the height of the own vehicle. The storage device 16 is constructed from, for example, a non-volatile memory.

The configuration and operation of each of the component parts of the parking assistance apparatus 1 illustrated in FIG. 3 is the same as the configuration and operation of each of the component parts of the parking assistance apparatus 1 illustrated in FIG. 1. Therefore, in the second embodiment, those component parts are denoted with the same reference numerals, and the description thereof is omitted.

The parking assistance apparatus 2 has the same functions as those of the parking assistance apparatus 1. The storage device 26 of the parking assistance apparatus 2 has the same function and performs the same operations as those of the storage device 16 of the parking assistance apparatus 1. Specifically, the respective storage devices 26 are configured to store information on the sizes of the other vehicles to which the parking assistance apparatus 2 are mounted. The storage devices 26 are configured to store, as information on the sizes of the other vehicles, at least one of, for example, the width, the length, or the height of the other vehicles.

The configuration and operation of each of the component parts of the parking assistance apparatus 2 illustrated in FIG. 3 are the same as the configuration and operation of each of the component parts of the parking assistance apparatus 2 illustrated in FIG. 1. Therefore, in the second embodiment, those component parts are denoted with the same reference numerals, and a description thereof is omitted.

Next, operation of each of the parts of the parking assistance apparatus 1 is described with reference to FIG. 4.

First, when other vehicles to which the parking assistance apparatus 2 are mounted intend to exit from parking spaces, information on the other vehicles are transmitted to the communication device 11 of the own vehicle from the communication devices 21 mounted to the respective other vehicles (Step S21). The information on the other vehicles are information indicating that the other vehicles intend to exit from the parking spaces. The information on the other vehicles contain information on the exit directions of the other vehicles. The information on the other vehicles also contain information on the sizes (e.g., widths, lengths, or heights) of the other vehicles acquired from the storage devices 26 and information on the positions of the parking spaces of the other vehicles acquired by the position sensors 25.

Next, the communication device 11 sequentially receives the information on the respective other vehicles transmitted from each of the plurality of other vehicles (Step S22).

Next, the route calculation unit 12 compares, by using the information on the other vehicles received from the plurality of other vehicles, the information on the sizes of the respective other vehicles with the information on the size of the own vehicle, which can be acquired from the storage device 16, and selects the parking spaces, in which the other vehicles having the same size as the size of the own vehicle or larger than the size of the own vehicle were parked, from among the empty parking spaces (Step S23).

Steps S24 and S25 are the same as Steps S4 and S5 illustrated in FIG. 2, respectively, and hence the description thereof is omitted here.

As described above, according to the second embodiment, a parking space having a size (i.e., width, length, or height) in which the own vehicle is capable of being parked can be determined from among the parking spaces of the plurality of other vehicles exiting from parking spaces.

Third Embodiment

Now, a parking assistance system according to a third embodiment of the present invention is described with reference to the accompanying drawings. The configuration of the parking assistance apparatus according to the third embodiment is the same as the configuration illustrated in FIG. 1, and hence FIG. 1 may be referred to for the description thereof. FIG. 5 is a processing flowchart for illustrating a flow of the processing of the parking assistance apparatus according to the third embodiment.

First, the configuration of the parking assistance system according to the third embodiment and the configuration of a parking assistance apparatus included in the parking assistance system are described with reference to FIG. 1.

In the third embodiment, the parking space sensor 14 of the parking assistance apparatus 1 is configured to detect whether or not the parking space of the own vehicle is a parking space for disabled people, and to output the detection result as information on a parking space type. Therefore, the information on the parking space type is information indicating whether or not a parking space is a parking space for disabled people.

The configuration and operation of each of the component parts of the parking assistance apparatus 1 of the third embodiment are the same as the configuration and operation of each of the component parts of the parking assistance apparatus 1 illustrated in FIG. 1. Therefore, the description thereof is omitted.

The parking assistance apparatus 2 has the same functions and performs the same operations as those of the parking assistance apparatus 1. Specifically, the parking space sensor 24 of the parking assistance apparatus 2 mounted to the other vehicles is configured to detect whether or not the parking spaces of the other vehicles are parking spaces for disabled people, and to output the detection result as information on the parking space type.

Next, the operation of each of the parts of the parking assistance apparatus 1 is described with reference to FIG. 5.

First, when the other vehicles, to which the parking assistance apparatus 2 are mounted, intend to exit from the parking spaces, information on the other vehicles are transmitted to the communication device 11 of the own vehicle from the communication devices 21 mounted to the respective other vehicles (Step S31). The information on the other vehicles are information indicating that the other vehicles intend to exit from a parking space. The information on the other vehicles contain information on the exit directions of the other vehicles. The information on the other vehicles also contain information on the parking space type acquired by the parking space sensor 24 and information on the positions of the parking spaces acquired by the position sensor 25.

Next, the communication device 11 receives the information on the parking space types and the information on the positions of the parking spaces of the respective other vehicles, which are transmitted from the plurality of other vehicles (Step S32).

Next, the route calculation unit 12 refers to the information on the parking space types received from the plurality of other vehicles, and selects, from among the received types of parking spaces, the parking spaces that are parking spaces for disabled people (Step S33).

Steps S34 and S35 are each the same as Steps S4 and S5 illustrated in FIG. 2, respectively, and hence the description thereof is omitted here.

As described above, according to the third embodiment, the own vehicle can be promptly guided to a parking space for disabled people from among the parking spaces of the plurality of other vehicles exiting from the parking spaces.

In the third embodiment, there is described an example in which the route calculation unit 12 selects, in Step S33, the parking spaces for disabled people as the parking spaces based on the information on the parking space types. However, the present invention is not limited to such a case, and Step S3 of the first embodiment may be combined with Step S33. Specifically, in Step S33, first, the route calculation unit 12 may compare the information on the sizes (e.g., widths, lengths, or heights) of the parking spaces of the respective plurality of other vehicles to one another, select, from among the parking spaces, parking spaces in which the own vehicle is capable of being parked, and then select, from among those selected parking spaces, the parking spaces for disabled people as the parking spaces based on the information on the parking space types.

Further, in the third embodiment, there is described an example in which the third embodiment is applied to the configuration of the first embodiment illustrated in FIG. 1. However, the present invention is not limited thereto, and the third embodiment may be applied to the configuration of the second embodiment illustrated in FIG. 3. Step S23 of the second embodiment may also be further combined with Step S33. Specifically, in Step S33, first, the route calculation unit 12 may select, based on the information on the sizes (e.g., widths, lengths, or heights) of the respective plurality of other vehicles and the size of the own vehicle, parking spaces in which the other vehicles larger than the own vehicle were parked, and then select, from among those selected parking spaces, the parking spaces for disabled people as the parking spaces based on the information on the parking space types.

The present invention is suited to the parking assistance system capable of appropriately detecting the parking space of the own vehicle. In the first to third embodiments, there are described examples in which the parking assistance system according to the present invention is applied to the parking of the automobile or other such vehicle. However, the present invention is not limited thereto, and the parking assistance system according to the present invention can be applied, for example, to the parking of various types of mobile bodies, for example, carts for carrying goods and drones.

What is claimed is:

1. A parking assistance system, which is configured to assist with parking of an own vehicle in a parking space, the parking assistance system comprising:
    a first parking assistance apparatus to be mounted to the own vehicle; and
    a second parking assistance apparatus to be mounted to other vehicle different from the own vehicle,
    the second parking assistance apparatus comprising:
        a second parking space sensor configured to acquire information of a size of a parking space in which the other vehicle is parked as size information;
        a second position sensor configured to detect and output information of a position of the parking space of the other vehicle; and
        a second communication device configured to transmit, when the other vehicle exits from the parking space, the size information and the information of the position of the parking space of the other vehicle,
    the first parking assistance apparatus comprising:
        a first communication device configured to receive the size information and the information of the position of the parking space of the other vehicle, which are transmitted from the second communication device;
        a first position sensor configured to detect a position of the own vehicle to output information of the position of the own vehicle; and
        a processor configured to:
            select at least one parking space in which the own vehicle is capable of being parked based on the size information received by the first communication device;
            determine, based on the information of the position of the parking space of the other vehicle received by the first communication device and the information of the position of the own vehicle, the parking space closest to the own vehicle from among the at least one parking space; and
            perform control for guiding the own vehicle to the parking space.

2. The parking assistance system according to claim 1, wherein the second communication device is configured to output information of the size of the other vehicle stored in a second memory as additional size information.

3. The parking assistance system according to claim 1, wherein the first parking assistance apparatus further comprises a first memory configured to store information of a size of the own vehicle to output the acquired information as size information of the own vehicle, and wherein the processor is configured to select the parking space in which the own vehicle is capable of being parked based on the size information and the size information of the own vehicle.

4. The parking assistance system according to claim 1, wherein the second parking space sensor is configured to detect whether or not the parking space of the other vehicle is a parking space for disabled people to output a detection result as parking space type information, and wherein the processor is configured to select, based on the parking space type information from the second parking space sensor, a parking space for disabled people from among the at least one parking space.

5. The parking assistance system according to claim 1, wherein the parking space in which the other vehicle is parked includes a space that is occupied by the other vehicle before the other vehicle exits from the parking space.

6. The parking assistance system according to claim 1, wherein the size of the parking space includes a width of the parking space.

7. The parking assistance system according to claim 1, wherein the size of the parking space includes a length of the parking space.

8. The parking assistance system according to claim 1, wherein the size of the parking space includes a height of the parking space.

* * * * *